Jan. 20, 1925.                                                                     1,523,524
S. B. HARVEY
FUEL CONDENSER FOR INTAKE MANIFOLD OF INTERNAL COMBUSTION ENGINES
Filed June 11, 1921
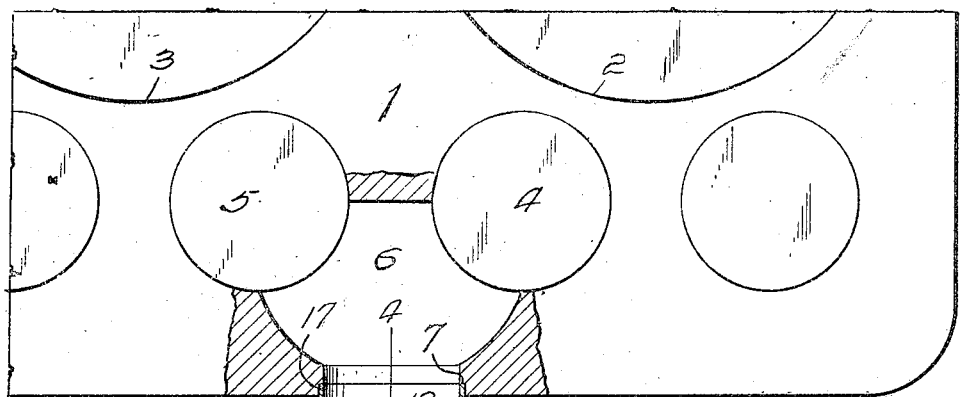
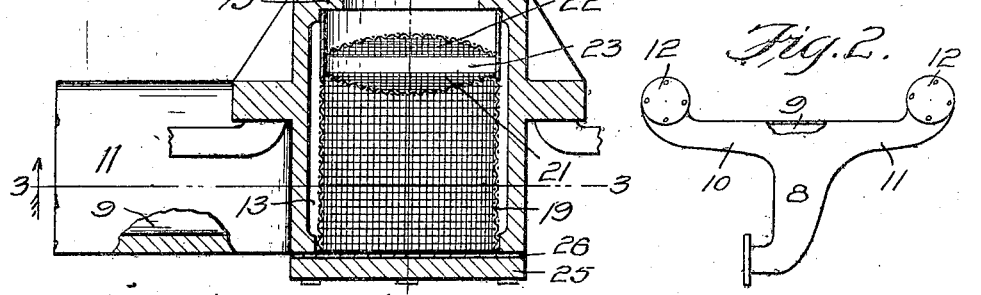
Inventor:
Samuel B. Harvey.

Patented Jan. 20, 1925.

1,523,524

UNITED STATES PATENT OFFICE.

SAMUEL B. HARVEY, OF WELLSTON, MISSOURI.

FUEL CONDENSER FOR INTAKE MANIFOLDS OF INTERNAL-COMBUSTION ENGINES.

Application filed June 11, 1921. Serial No. 476,960.

*To all whom it may concern:*

Be it known that I, SAMUEL B. HARVEY, a citizen of the United States, residing at Wellston, in the county of St. Louis and State of Missouri, have invented certain new and useful Improvements in Fuel Condensers for Intake Manifolds of Internal-Combustion Engines, of which the following is a specification.
My invention relates to intake manifolds for internal combustion engines, and, more particularly to a gasoline vapor condenser to be positioned in the gas outlet passages at the ends of the manifold adjacent the intake ports of the engine.

The objects of my present invention, are, first, to provide an intake manifold having a condensing chamber at each end disposed at a right angle to, transversely of and above the main gas passage leading from the carbureter to the engine cylinders; second, to afford removable means within each condensing chamber in the path of the gasoline vapor flowing from the carbureter to the engine cylinders for retarding, intercepting and condensing the gasoline vapor prior to entering the engine cylinders, so that the gasoline may be drawn into the cylinders from the condensing chambers in a practically cold atomized liquid state instead of the usual preheated vaporized state, thereby increasing the explosive power with a minimum expenditure of fuel; third, to provide removable retarding, intercepting and condensing means with a plurality of screened partitions; and, fourth to provide means for first intercepting the gasoline vapor when flowing in an upwardly path out of the main gas passage of the intake manifold and again immediately thereafter while directed in a horizontal path into the cylinder intake ports of the engine.

With the above and other objects in view, the invention consists in the novel features of construction, arrangement and combination of parts hereinafter more fully described and finally pointed out in the claims hereto appended Referring to the accompanying drawings, forming a part of this specification wherein like characters of reference denote similar parts throughout the several views:

Fig. 1, is a top plan view of a "Ford" motor block with the head removed, showing a portion of my improved form of intake manifold in section, and, one of the horizontal gasoline condensing chambers thereof provided with my improved gasoline vapor condenser.

Fig. 2, is a front elevation of a complete manifold for a four cylinder engine.

Fig. 3, is a sectional view taken on line 3—3 of Fig. 1, looking in direction of the arrow.

Fig. 4, is a sectional view taken on line 4—4 of Fig. 2, looking in direction of the arrow.

Referring to the drawings, the reference character 1 designates a portion of a motor block; 2, the front, or number one cylinder; 3, number two cylinder; 4, the intake valve to number one cylinder; 5, the intake valve to number two cylinder; 6, the cylinder port leading to the intake valves of numbers one and two cylinders, and, 7, a seat concentric with the cylinder intake port 6.

In carrying out the aim of my invention, I employ an intake manifold 8 having the usual main gas passage 9 within the arms 10 and 11 thereof. The arms 10 and 11 are each provided at their extremities with a suitable tubular head 12 extending beyond the inner side face of the manifold arms and having the horizontally disposed gasoline vapor condensing chamber 13 provided with the lower opening 14 to permit gasoline vapor to flow upwardly into the horizontally disposed gasoline vapor condensing chamber 13. The heads 10 and 11 are each provided at their inner ends with the internal flange 15 having the ring seat 16. A suitable ring 17 is interposed between the ring seat 16 of the flange 15 and the engine cylinder to form a constructed fuel passage 18 leading to the cylinder intake port or passage 6, as clearly shown in Figs. 1 and 4.

Disposed within each horizontally disposed chamber 13 is a cylindrical condenser cage consisting of the wire mesh end 19 and the non-mesh metal end 20. The non-mesh tubular metal end or sleeve 20 is provided with the suitable wire mesh partitions 21 and 22 to form a chamber, or space 23 therebetween and a chamber, or space 24 between the partition 21 and the end plate 25 of the heads, which plate holds the condenser cage in position with the chamber or passage 13 with its forward end in engagement with the internal flange 15 at the outlet end of the heads. A suitable packing 26 may be interposed between the outer face of each head 10 and 11 and the closure plate 25 therefor, as is manifest.

It will be observed that the condensing cage is at all times saturated, or covered with liquid fuel from which it is carried or fed into the engine cylinders in a cold atomized liquid state, thus the condenser cage acts as a so-called auxiliary carbureter for supplying the fuel direct to the engine cylinders after having been condensed in its passage from the carbureter to the engine cylinders.

It is evident from the foregoing description that the mixture of gasoline and air from the carbureter in flowing through the passage 9 of the arms 10 and 11 of the manifold first passes upwardly, around and through the wire screen end 19 of condenser cage, and is then again intercepted by the screen partitions 21 and 22 which further condenses the gasoline vapor so that it is drawn into the cylinders from the screen condensing cage in a wet, saturated or liquid fuel state instead of a preheated gaseous or vaporized state, as is now the prevailing custom.

The many advantages of the herein described invention will readily suggest themselves to those skilled in the art to which it appertains.

I do not desire to be understood as limiting myself to the exact details of construction and arrangement of parts as herein described and illustrated, as it is manifest that variations and modifications may be made without departing from the spirit and scope of my invention and the terms of the following claims, hence I wish it to be understood that I reserve the right to make any such changes, or modifications as may fairly fall within the scope of the appended claims when fairly construed.

What I claim is:

1. In combination with an engine having cylinder and fuel intake ports, of an intake manifold for said engine, said manifold having a horizontally disposed condensing chamber at its outlet terminals, a removable closure for one end of each chamber, a tubular wire mesh cage having a condensing chamber positioned within each of the horizontally disposed terminal chambers of the manifold so that fuel in its path of travel to the engine cylinder will be intercepted in its travel into the cage and the heavier particles of fuel condensed and a plurality of wire mesh partitions disposed within the cage forming an auxiliary condensing chamber therebetween, said partitions finally intercepting the fuel traveling toward the engine cylinder from the initial condensing chamber of the cage for further condensation thereof just prior to entrance of the fuel to the engine cylinders so that the fuel taken into the cylinders will lie in a cool atomized state.

2. In combination with an intake manifold and an engine cylinder to which the manifold is attached, of an enlarged head formed at the outlet ends of said manifold having a horizontally disposed chamber communicating with the manifold passage from its lower side and having its ends open, a shoulder within said chambers, a tubular wire mesh condensing cage suspended within each chamber and engaging the shoulder thereof at its inner end which serves as a stop and a support for the cage, a plurality of partitions disposed within the cage and suitably spaced apart to provide a chamber therebetween and a closure for the outer open end of each manifold head to prevent displacement of the cages within their chambers and to provide a chamber between the outer partition and the closures.

3. A fuel condenser for the intake manifold of internal combustion engines comprising a cage, said cage consisting of a cylindrical tubular sleeve formed at its intake end of wire mesh material and at its discharge end of non-wire mesh material, and a plurality of wire mesh partitions disposed in spaced relations at the juncture of the two sleeve sections of the cage, and said cage adapted to be disposed within the outlet port of the intake manifold in such a manner that the wire mesh sleeve section of the cage will permit of a gravity drain of excess fuel directly back to the source of supply.

4. A gaseous fuel condenser for the intake manifold of internal combustion engines comprising an open ended wire mesh tubular cage forming a condensing chamber and a plurality of wire mesh partitions disposed within the cage near one end thereof, said partitions being suitably spaced apart to provide an auxiliary condensing chamber for the cage, said chamber being disposed at the outlet end of the cage and said cage adapted to be disposed at the outlet end of the intake manifold with the first mentioned condensing chamber so disposed therein as to permit of a gravity drain of excess fuel back to the source of supply.

5. In combination with an intake manifold having terminal heads provided with chambers having a diameter greater than the intake ports of an internal combustion engine to which the manifold is attached, a tubular wire mesh fuel condensing cage disposed within the chambers of the manifold heads, said cages being of a diameter less than the diameter of the chambers so as to permit the fuel drawn through the manifold to completely encircle the cage for interception thereby in being drawn into the cage and a plurality of wire mesh partitions disposed in suitable spaced relation within the cage for intercepting the passage of fuel through the cage in its direction of travel toward the engine intake ports for delivering the fuel to the engine cylinders in a thoroughly oxidized state.

6. In combination with the gas outlet ends of an intake manifold for internal combustion engines, said outlet ends being enlarged to form chambers having opposite ends open and each provided with a passage for communication with the manifold passages, said chambers being greater in diameter than the engine intake ports, a fuel condensing cage mounted in each chamber, a removable closure for the outer end of each chamber for holding the cages against longitudinal displacement, partitions disposed within each cage to assist the cage in intercepting the fuel and condensing same to provide a surplus of instant fuel supply at a point adjacent the engine intake port due to the fact that the cage has a fuel collecting area greater than the capacity of the engine intake ports.

In testimony whereof, I have hereunto signed my name to the specification.

SAMUEL B. HARVEY.